Jan. 28, 1964     K. W. KUHN ETAL     3,119,997
MULTI-COLOR INDICATOR

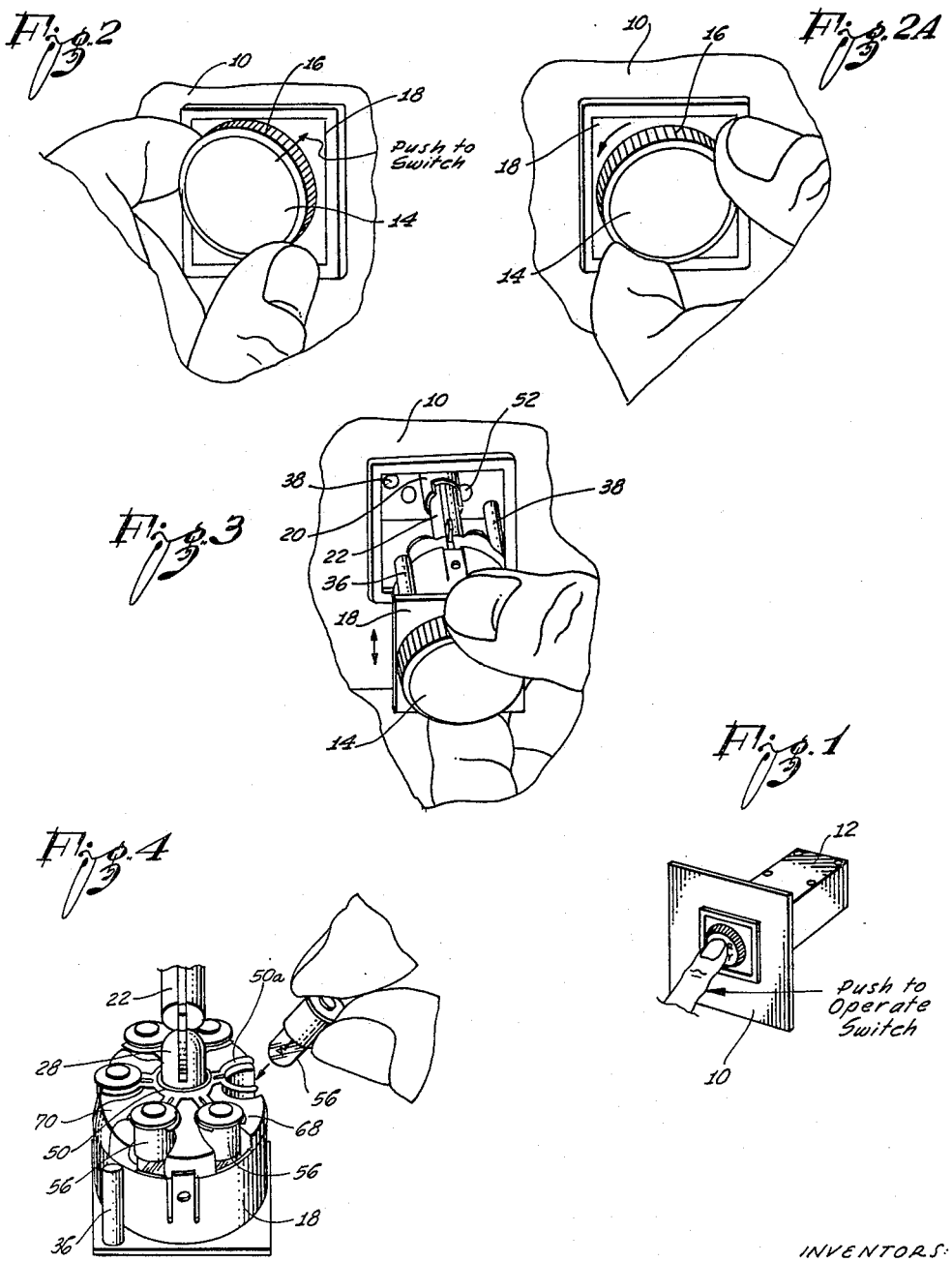

Filed July 10, 1962     3 Sheets-Sheet 2

INVENTORS.
Kurt W. Kuhn
Herbert H. Ast

By Keith D. Beecher
Attorney

Jan. 28, 1964 K. W. KUHN ETAL 3,119,997
MULTI-COLOR INDICATOR
Filed July 10, 1962 3 Sheets-Sheet 3
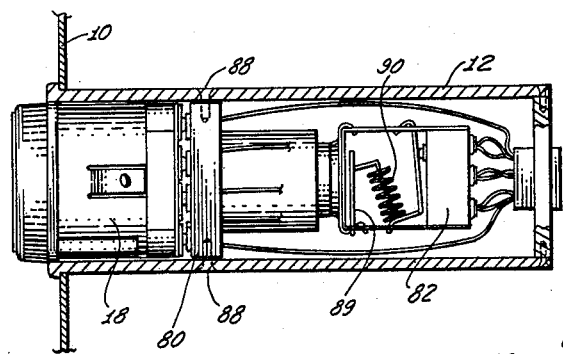
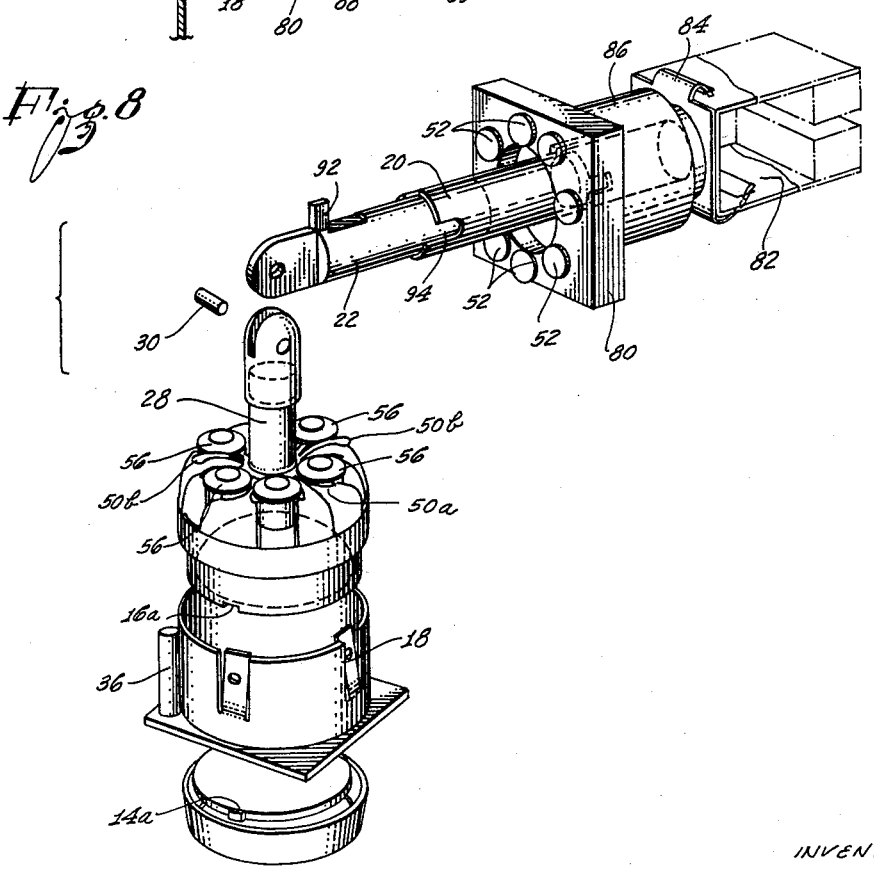
INVENTORS:
Kurt W. Kuhn
Herbert H. Ast
By Keith D. Beecher
Attorney 3,119,997
MULTI-COLOR INDICATOR
Kurt W. Kuhn, Santa Monica, and Herbert H. Ast, Los Angeles, Calif., assignors to Radar Relay, Inc., Santa Monica, Calif., a corporation of California
Filed July 10, 1962, Ser. No. 208,830
12 Claims. (Cl. 340—366)

The present invention relates to electrically energized indicator lamp asesmblies, and it relates more particularly to an improved multi-color indicator lamp assembly for indicating the condition of an electrical system associated therewith, and also for providing a switching control for such a system, if so required.

The multi-color indicator assembly of the present invention may be used, for example, in automatic checkout equipment for missile guidance systems, and the like. The indicator assembly of the invention also finds utility on the control panels of data processors, computers, for indicating the condition of the operational systems thereof, and in other related electronic equipment and systems.

In fact, the indicator of the invention has general utility in a wide variety of control systems and equipment.

The embodiment of the invention to be described is a tri-color indicator which is capable, for example, of being selectively energized to glow "red" so as to indicate a malfunction or other non-operative or dangerous condition in the associated system; to glow "amber" so as to indicate a marginal operative condition in the associated system; and to glow "green" to indicate a fully operative condition in the associated system.

The tri-color indicator of the embodiment to be described also includes an associated switching mechanism which can be operated merely by depressing the front face of the indicator into the plane of the supporting control panel. This switching mechanism is most convenient in that it can be operated, for example, when a particular condition in the associated electrical system is indicated by the illuminated color of the indicator, so as to initiate a particular action in the system.

The indicator lamps in the embodiment of the invention to be described are mounted on a resilient lamp holder which includes a plurality of radial finger-like elements. These finger-like elements are configured to permit the lamps to be inserted or removed conveniently from the side of the exposed portion of the indicator assembly, when the inner mechanism of the indicator has been pulled out from the housing and turned down, as described above.

The color filter elements in the assembly to be described have a segmental configuration, and they are conveniently mounted and supported to be easily and individually removable when the internal portion of the indicator is exposed, as described above. The assembly of the invention is such that any one of the color filter segments may be removed without disturbing the others. This provides for the convenient interchange of the color filters with other different color filters to provide flexibility in the assembly.

A feature of the particular switch-type indicator embodiment to be described is the provision for a mechanical interlocking mechanism. This mechanism, as will be described, is conceived and constructed to prevent inadvertent actuation of the associated switching mechanism when the unit is opened, in the manner described above, for lamp replacement or other purposes.

Yet another feature of the invention is the provision of such a multi-color indicator assembly which incorporates an indicia bearing translucent screen on its forward end, which screen may be conveniently replaced to change the indicia or nomenclature without disturbing any of the other components of the assembly.

A further feature of the invention is the provision of such an improved multi-color indicator assembly which is constructed so that each of its different components is configured to permit it to fit into place with its associated components only when it is properly indexed, so as to assure that the unit will not be assembled improperly. This particular construction serves to eliminate any likelihood of the indicator providing for erroneous indications due to its being improperly assembled.

The multi-color indicator to be described herein is mounted in a housing which, in turn, is constructed to be mounted on a control panel. The housing and the mounting thereof may be similar to the housing described and claimed, for example, in copending application Serial No. 208,021, filed July 6, 1962, in the names of the present inventors and assigned to the present assignee.

In the drawings:

FIGURE 1 is a perspective view of the multi-color indicator assembly of the invention, and illustrating the manner in which the assembly may be mounted on a control panel, as more fully described in the copending application, Serial No. 208,021;

FIGURE 2 is a front view of the multi-color indicator of the invention;

FIGURE 2A is a view, like FIGURE 2, and illustrating the manner in which the indicator assembly may be turned in its housing to enable the assembly to be drawn out from the supporting control panel for servicing purposes;

FIGURE 3 shows the indicator assembly in an extended position;

FIGURE 4 is a fragmentary view of the indicator assembly of the invention, with the assembly drawn out from the control panel and turned down so as to permit the replacement of the electric indicator lamps or color filter elements;

FIGURE 7 is a side sectional view of the indicator assembly of the invention, and illustrating particularly the manner in which a switching mechanism is included in the assembly; and FIGURE 8 is a detailed perspective view of the indicator assembly of the invention, also in exploded form, to illustrate the various components of the assembly, and the manner in which they are assembled.

Figure 5:
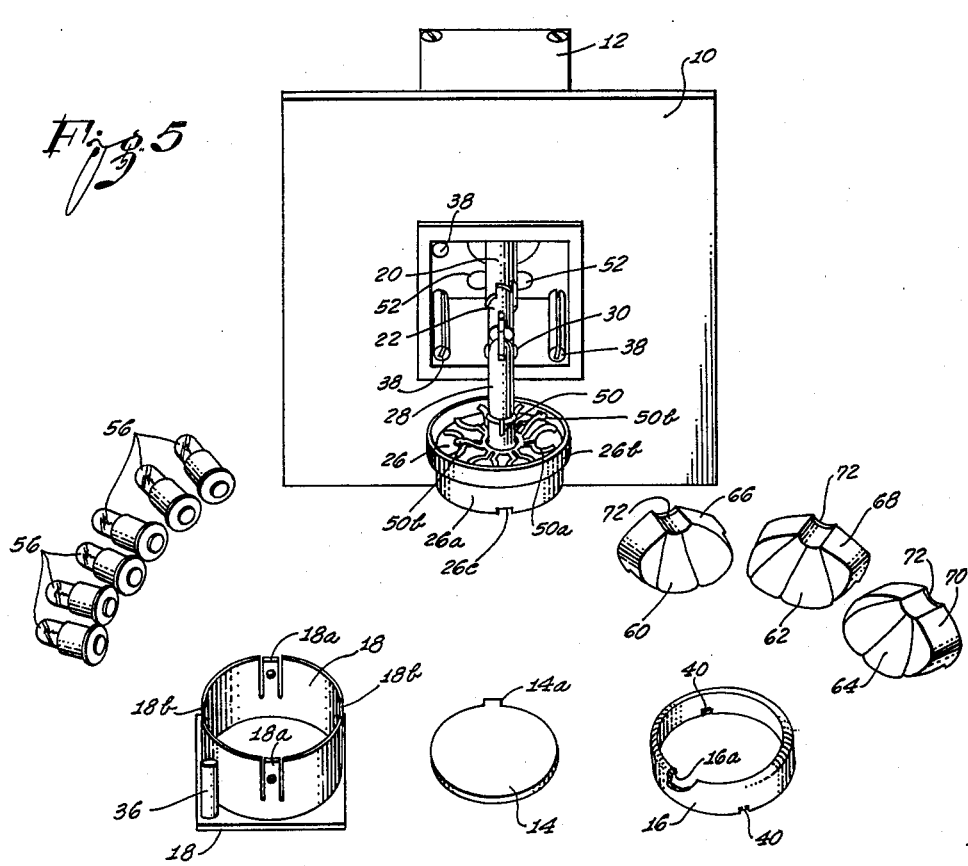
FIGURE 5 is an exploded view of the indicator assembly of the invention, and illustrating the various components which go to make up the assembly.

As illustrated in FIGURE 1, and as more fully explained in the copending application Serial No. 208,021, the multi-color indicator assembly of the present invention is adapted o be mounted on a control panel, such as the control panel 10 in FIGURE 1. It is to be understood, of course, that a plurality of like assemblies, all incorporating the concepts of the present invention, may be mounted in rows and columns on the control panel, such as the control panel 10.

The illustrated multi-color indicator assembly includes a housing 12, and it is supported on the control panel 10 in the manner explained in detail in the copending application Serial No. 208,021.

The indicator assembly of the invention is constructed to glow in different colors through a disc-shaped piece of diffusing plastic 14, on which suitable indicia may be inscribed; the colors exhibited by the assembly being indicative of the operating condition of the associated system, as explained above. The diffusing disc 14 is mounted in a retaining ring 16. The retaining ring 16 is, in turn, supported in an annular bracket 18, in a manner to be described.

A non-rotatable, tubular shaft 20 is mounted in the housing 12, and this shaft is mounted so that it may be pulled out from the housing a short distance, as shown in FIGURES 3 and 5.

A rotatable, inner shaft 22 is fitted coaxially in the shaft 20, and the shaft 22 is adapted to move in and out of the tubular shaft 20 in telescopic relationship therewith. The shaft 22, as will be described, is a switch actuating shaft, and it is capable of reciprocal movement within the tubular shaft 20, when the indicator assembly is in the closed position shown in FIGURES 1, 2 and 7, to actuate a switching mechanism in the housing.

The illustrated multi-color indicator assembly also includes a lens 26 which has a disc-shaped configuration. The lens 26, for example, may have a convex rear surface, and it may have a concave forward surface. The diffusing disc 14 fits against the front surface of the lens 26; so that the disc and lens, in addition to performing their optical functions, cooperate as a push-button for the switching mechanism, as indicated in FIGURES 1 and 2.

The lens 26 may be formed, for example, of a clear acrylic plastic, and it has a forward portion designated 26a and a rear, skirt portion of somewhat greater diameter and designated 26b. The lens 26 also has an integral center post 28 which extends outwardly from its rear convex rear surface. The rear portion of the center post 28 may be reinforced by a metallic coating composed, for example, of stainless steel. The center post 28 is pivotally mounted to the end of the switch actuator shaft 22 by means of a suitable pivot pin 30. Therefore, when the inner mechanism of the indicator assembly is drawn out to the position of FIGURE 3, the forward portion of the extended mechanism may be turned down, as shown in FIGURES 4 and 5 to permit removal of the lamps and color filter segments.

The peripheral edges of the portions 26a and 26b of the lens 26 are silvered and coated with black lacquer, or are otherwise treated to render the edges opaque. The skirt portion 26b of the lens 26 extends back beyond the convex rear surface of the lens 26, as shown in FIGURE 5.

The annular bracket 18 is adapted to slip over the skirt portion 26b of the lens 26. The bracket 18 has a pair of resilient fingers 18a which engage slots in a pair of indexing posts 38 in the housing 12, so as to index the bracket 18 and hold it in place. The bracket 18 also includes an indexing post 36 which cooperates with the above-mentioned posts 38 in the housing 12, and with a further indexing post 38 therein, to assure that the indicator assembly will have the proper orientation when inserted into the housing. As illustrated, the housing 12 of the particular embodiment has a square configuration, and the end panel of the bracket 18, likewise, has a square configuration.

The retaining ring 16 has a pair of inner radial projections 40 which engage respective mating channels on the forward edge 26a of the lens 26. A deformed resilient washer (not shown) may also be provided. To assemble the indicator, the disc 14 is placed in the ring 16 with the washer interposed between it and the rim 16a of the ring. The ring is inserted into the bore of the annular bracket 18 and over the forward reduced-diameter edge 26a of the lens 26. The projections 40 are first aligned with the entrance to the mating channels on the edge 26a of the lens 26, and the ring 16 is pushed into place and subsequently turned slightly with respect to the lens 26 to lock the ring 16 in the mating channels. The deformed resilient washer serves to bias the disc 14 firmly against the rim 16a of the ring 16.

The disc 14 has an indexing tab 14a extending radially from its peripheral edge. This tab engages an indexing slot 26c in the forward edge 26a of the lens 26.

A resilient metallic lamp holder 50 is slidably mounted on the center post 28 of the lens 26. The lamp holder includes a plurality of resilient radial fingers 50a, each within a bifurcated end, as best shown in FIGURES 4 and 5. Each radial finger releasably supports an electrical indicator lamp in its bifurcated end, and also makes electrical contact to the side contact of the supported lamp.

The lamp holder 50 also includes a pair of resilient arms 50b. These arms contact conductive buttons 52 in the housing 12 when the mechanism is in place in the housing. This contact provides a suitable ground or return connection, so that an appropriate electrical path may be established to the side contacts of the electric indicator lamps removably supported in the ends of the fingers 50a of the lamp holder 50.

The buttons 52 are in the nature of fixed, non-resilient, electrical contacts, which are mounted in the housing 12. Certain ones of these electrical contacts are intended to contact the arms 50b of the holder 50, as mentioned above. Further ones of the contacts 52 are intended to contact the center contacts of respective ones of the electrical indicating lamps 56 supported in the lamp holder 50. The electrical indicating lamps are resiliently biased against respective ones of the further fixed contacts 52 by the resilient fingers 50a of the lamp holder 50 when the mechanism is in place in the housing 12, as shown in FIGURES 1 and 2.

The electric indicator lamps 56 are releasably held by the resilient radial fingers 50a of the lamp holder 50 in position such that the lamp holder 50 resiliently biases the lamps back against the further contacts 52, when the assembly is moved to the closed position shown in FIGURES 1 and 2. To remove any of the spring-loaded lamps, it is merely necessary to rotate the internal mechanism of the assembly in a counter-clockwise direction with respect to its housing, as shown in FIGURE 2A, and to pull the mechanism out from the panel 10 as shown in FIGURE 3, and then to turn the mechanism down to the position shown in FIGURE 4. Then, the burned out lamps may be easily and conveniently removed from the lamp holder 50 by a side-loading action, as shown in FIGURE 4, for replacement purposes.

It will be observed that when the assembly is moved out from the supporting control panel and turned down to the position of FIGURE 4, no tools are required, and that all the components of the assembly are retained in a captive condition when the assembly is in its opened position. The lamps may then be individually removed and replaced, without disturbing any of the other components of the assembly.

The indicator assembly of the invention, in the illustrated embodiment, also includes a plurality of color filter elements 60, 62 and 64. These color filter elements may each represent a different selected color, and they are supported in the annular retainer member 32 and by the annular bracket 18 in position around the center post 28 and spaced from the rear face of the lens 26. The color filters are retained in the retainer 32 against rotational movement, by resilient cut-out members 18b which engage corresponding grooves in the peripheral edge of two of the filter segments. The filter segments have a peripheral shoulder (see FIGURE 4) intermediate the front and rear faces, and this shoulder engages the inner rim of the retainer 18. This causes the filters to be held in position in the housing 12 spaced from the inner face of the lens 26, so as to enable the lens 26 and disc 14 to move slightly back and forth in the housing.

The color filters 60, 62 and 64 may be formed of acrylic resin, for example, with an appropriate color dye on their front faces. Each color filter is provided with a pair of rear cavities for receiving corresponding pairs of electrical indicator lamps 56, as shown in FIGURE 4. These cavities permit the lamps to extend down into the corresponding color filters, so that when a particular pair of lamps is illuminated, the color of the color filter is projected through the lens 26 to illuminate the diffusing disc 14 in that particular color. The rear surface of each of the color filters 60, 62 and 64 is rendered opaque by means, for example, of a silver coating, and the color filters are each built up to a desired thickness by a suitable substance, such as an opaque resin, as illustrated at 66, 68 and 70 in FIGURE 5.

When the segmental color filters 60, 62 and 64 are in place in the assembly, as shown in FIGURE 4, they serve to hold the lamp holder 50 on the post 28. This is achieved by grooves 72 formed in each of the resin portions 66, 68 and 70 of the filters, these grooves receiving a corresponding lip on the lamp holder. The support of the lamp holder is such that the lamps 56 are resiliently biased back against the fixed contacts 52.

As best shown in FIGURE 8, the fixed contacts 52 may be mounted on a panel 80 in the housing 12. The provision of the fixed contacts 52, and of the resilient side contacts formed by the fingers 50a of the lamp holder 50, provides for a simplified construction, as compared with the prior art structures in which the lamps are non-resiliently supported and contacts, such as the contacts 50, are resiliently biased against the lamps.

As best shown in FIGURES 7 and 8, a switching mechanism 82 is mounted in the housing 12 on the rear end of the indicator assembly. The switch 82 is removably mounted in a bracket 84 which, in turn, is mounted on the rear end of a barrel 86. The barrel 86 is mounted on the rear surface of the panel 80 which, in turn, is mounted in the housing 12 by means of set screws, such as the set screws 88.

The shaft 20 extends through a central aperture in the panel 80, and as mentioned above, the shaft 20 may be moved out to the position shown in FIGURE 8, or it may be moved into the position of FIGURE 7, so as to facilitate the opening of the assembly for lamp replacement and other purposes, as described above. The shaft 20, however, and as mentioned above, is not rotatable in the housing, and it can be retracted only to a particular position, in which the forward edge of the tubular shaft 20 is substantially flush with the forward edge of the panel 80. The inner shaft 22, on the other hand, as also mentioned above, is rotatable, and it is movable in the shaft 20 against an actuating toggle 89 of the switch 82. The actuating toggle 89 is spring-loaded by a spring 90, so that the shaft 22 is normally biased to the left in FIGURES 7 and 8.

The inner switch-actuating shaft 22 has a radial projection 92 which engages the forward edge of the outer tubular shaft 20, when the inner shaft 22 has the angular position shown in FIGURE 8. This engagement of the projection 92 with the forward edge of the outer shaft 20 prevents the inner shaft 22 from being moved inwardly against the toggle 89 to actuate the switch 82.

However, a slot 94 is provided in the forward edge of the tubular, outer shaft 20, so that when the inner, switch-actuating shaft 22 is turned to a second angular position, the projection 92 is free to move back into the slot 94. This movement of the projection 92 into the slot 94 permits the switch actuating shaft 22 to be moved back against the toggle 89 to actuate the switch 82.

A radial slot is provided in the panel 80 which permits the projection 92 to pass through the panel, so that the shafts 22 and 20 may be pulled out to their extended position of FIGURE 8; but only when the shaft 22 is turned to the angular position illustrated in FIGURE 8.

Therefore, in order that the inner mechanism of the assembly may be extended to the position of FIGURES 3 and 4 for replacement purposes, the mechanism must be turned in a counter-clockwise direction, as shown in FIGURE 2A, to bring the projection 92 in alignment with the corresponding radial slot in the panel 80. However, when the mechanism is so turned, the shaft 22 assumes an angular position relative to the tubular shaft 20 such that the switch 82 cannot be actuated. This is because the projection 92 then engages the forward edge of the shaft 20, rather than the slot 94, when the shaft 22 is in the latter angular position. The above-described combination prevents inadvertent actuation of the switch 82 when the mechanism of the indicator assembly is being opened for lamp replacement, or other servicing reasons.

Figure 6:
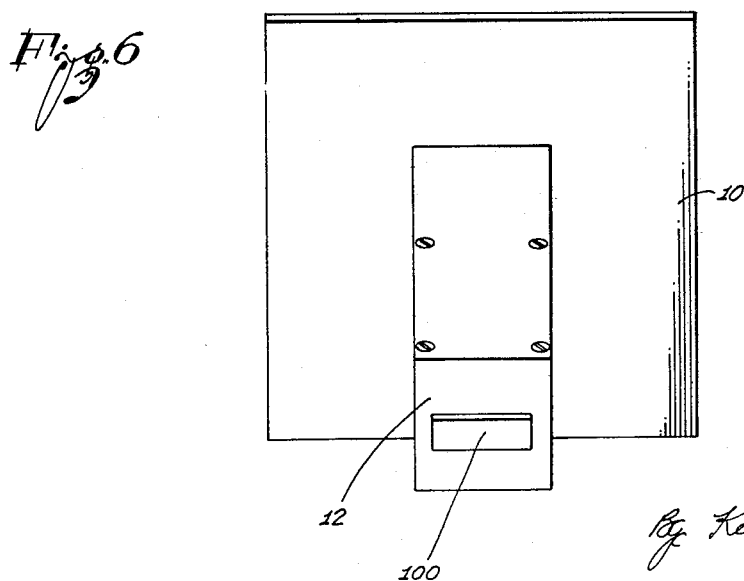
FIGURE 6 is a rear view of the indicator assembly, illustrating the assembly mounted on a control panel, in the manner more fully explained in the copending application Serial No. 208,021.

Appropriate connections may be made to the various lamps through a terminal board 100 (FIGURE 6) on the rear end of the housing 12. The color filters 60, 62 and 64 may be colored green, red and amber, for example. Then, when various pairs of the electrical indicator lamps 56 are energized, the translucent diffusion disc 14 is caused to glow either green, red or amber. Also, the switching mechanism 82 included in the indicator may be actuated, for example, upon a green indication, and merely by depressing the diffusion disc 14 into the plane of the panel 10.

When it is desired to replace an indicator lamp, or to change a color filter, it is merely necessary to turn the mechanism of the indicator assembly in a counter-clockwise direction in its housing, as shown in FIGURE 2A, and to pull the mechanism out from the plane of the supporting control panel, as explained above. This is achieved entirely from the front of the panel without the requirement for tools, and in an easy and straight-forward manner.

Even when revealed, as shown in FIGURE 4, all the internal components of the assembly are held captive. Then, the various components of the assembly may be individually removed and replaced in a simple manner, and without disturbing any of the other components.

As also explained, when the inner mechanism of the indicator assembly is rotated to pull the mechanism out from the supporting panel, the internal switching mechanism cannot be actuated, so that the inadvertent actuations of the switch are prevented.

While a particular embodiment of the invention has been shown and described, modifications may be made, and it is intended in the claims to cover all such modifications as fall within the scope of the invention.

What is claimed is:

1. A color indicator assembly including: a housing; shaft means mounted in said housing; a forward lens element having a center post extending outwardly from the rear surface thereof; means for pivotally mounting the end of said center post to the forward end of said shaft means; an annular lamp holder mounted on said center post and including at least one resilient radially extending finger for releasably holding an indicator lamp; and at least one color filter mounted adjacent said center post and adjacent the rear surface of said lens in position relative to the lamp in said lamp holder so that energization of the lamp causes its resulting light to be passed through the color filter and through said lens.

2. A color indicator assembly including: a housing; a center post pivotally mounted in said housing; at least one electrical contact mounted in said housing; lamp holder means mounted on said center post and including at least one resilient radially extending finger for releasably supporting an indicating lamp in electrical contact with said electrical contact; and at least one color filter mounted adjacent said center post in position relative to the lamp in said lamp holder so that energization of the lamp causes its resulting light to be passed through said color filter.

3. A multi-color indicator assembly including: a housing; shaft means mounted in said housing; a forward lens element having a center post extending outwardly from the rear surface thereof; means for pivotally mounting the end of said center post to the forward end of said shaft means; a plurality of electrical contacts mounted in said housing; an annular lamp holder mounted on said center post and including resilient radially extending fingers for releasably supporting a plurality of indicating lamps in electrical contact with respective ones of said electrical contacts; and a plurality of color filters mounted adjacent said center post and adjacent the rear surface of said lens in position relative to the lamps in said holder so that the energization of a particular lamp causes its resulting light to be passed through a corresponding one of said color filters and through said lens.

4. A multi-color indicator assembly including: a housing; shaft means mounted in said housing; a lens element having an integral center post extending outwardly from the rear surface thereof and pivotally mounted to the forward end of said shaft means; a plurality of segmental color filter elements removably positioned around said center post adjacent the rear surface of said lens element; a plurality of electrical contacts mounted in said housing; and an annular lamp holder slidably mounted on said center post and including a plurality of resilient radial fingers having bifurcated ends for releasably holding a corresponding plurality of indicating lamps in corresponding ones of said color filter elements and in electrical engagement with respective ones of said electrical contacts.

5. The indicator assembly of claim 4 and in which said annular lamp holder includes at least one further resilient radial finger for contacting a further one of said electrical contacts so as to form a return electrical connection for the indicating lamps held by the first-named resilient radial fingers.

6. A multi-color indicator assembly including: a housing; a shaft means mounted in said housing; a disc-shaped lens element having an integral center post extending outwardly from the rear surface thereof; means for pivotally mounting the end of said center post on the forward end of said shaft means; an annular bracket member mounted on said lens element and surrounding said lens element, said annular bracket member having an annular portion extending rearwardly from the rear surface of said lens element; a plurality of segmental color filter elements removably positioned in said annular portion of said annular bracket adjacent said rear surface of said lens element and surrounding said center post; a plurality of electrical contacts mounted in said housing; and an annular lamp holder slidably mounted on said center post and including a plurality of resilient radial fingers having bifurcated ends for releasably holding a corresponding plurality of indicating lamps in corresponding ones of said color filter elements and in electrical engagement with respective ones of said electrical contacts.

7. The indicator defined in claim 4 in which said shaft means is reciprocally mounted in said housing, and which includes electrical switching means mechanically coupled to said shaft means to be actuated thereby upon reciprocal movement thereof with respect to said housing.

8. The indicator assembly defined in claim 4 in which said shaft means includes an inner and an outer shaft coaxially and telescopically mounted with respect to one another, and which includes electrical switching means coupled to said inner shaft to be actuated upon reciprocal movement of said inner shaft with respect to said housing; and retainer means for permitting said inner shaft to be extended with respect to said outer shaft only when said inner shaft is turned to a particular angular position with respect to said housing, and for preventing actuation of said electrical switching means when said inner shaft is in said particular angular position.

9. A multi-color indicator assembly including: a housing; shaft means mounted in said housing; a disc-shaped lens element having an integral center post extending rearwardly from the rear surface thereof; means pivotally mounting the end of said center post on the forward end of said shaft means, said lens element having a rear annular skirt portion of increased diameter as compared with its forward portion; an annular bracket member adapted to fit over said rear skirt portion of said lens element to be resiliently retained thereon, said bracket member extending rearwardly of the rear surface of said lens element; a plurality of segmental color filter elements removably positioned in said annular bracket adjacent but spaced from said rear surface of said lens element and surrounding said center post; and an annular lamp holder slidably mounted on said center post and including resilient radial fingers having corresponding bifurcated ends for releasably holding a plurality of indicating lamps in corresponding ones of said filter elements.

10. The indicator of claim 4 in which said color filter elements each includes a relatively thick backing of an opaque material for forming at least one cavity for receiving a corresponding one of the indicator lamps.

11. The indicator of claim 6 in which the rear face of said lens element has a convex configuration and the segmental color filter elements present a concave forward face adjacent said convex face of said lens.

12. The indicator of claim 9 and which includes a light diffusing translucent disc member, and a second annular bracket member adapted to extend into concentric relationship with said first-mentioned annular bracket member to hold said translucent disc member in place over the front face of said lens element.

References Cited in the file of this patent

UNITED STATES PATENTS

| 2,167,270 | Woodward | July 25, 1939 |
| 2,340,053 | Grimes | Jan. 25, 1944 |
| 2,710,956 | Hallerburg et al. | June 14, 1955 |
| 2,883,652 | Ireland | Apr. 21, 1959 |
| 2,967,298 | Riggins et al. | Jan. 3, 1961 |
| 3,080,554 | Jacobel et al. | Mar. 5, 1963 |